(12) United States Patent
Mangold et al.

(10) Patent No.: US 8,594,120 B2
(45) Date of Patent: Nov. 26, 2013

(54) CELLULAR WIRELESS LAN WITH FREQUENCY DIVISION MULTIPLEX IN TV WHITE SPACE

(75) Inventors: Stefan Mangold, Zürich (CH); Roberto Aiello, Bend, OR (US); Markus Gross, Zürich (CH); Thomas Gross, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 130 days.

(21) Appl. No.: 13/045,268

(22) Filed: Mar. 10, 2011

(65) Prior Publication Data
US 2011/0222493 A1 Sep. 15, 2011

Related U.S. Application Data

(60) Provisional application No. 61/415,323, filed on Nov. 18, 2010, provisional application No. 61/313,683, filed on Mar. 12, 2010.

(51) Int. Cl.
*H04L 12/413* (2006.01)
(52) U.S. Cl.
USPC ........................................................ 370/445
(58) Field of Classification Search
USPC .............. 370/329, 310.2, 328, 319, 281, 295, 370/338, 344, 310, 431, 441, 437, 445, 461, 370/462, 229, 235, 230, 276
See application file for complete search history.

(56) References Cited

U.S. PATENT DOCUMENTS

| | | | | |
|---|---|---|---|---|
| 5,124,985 A * | 6/1992 | Hoshikawa | ................... | 370/347 |
| 6,539,028 B1 * | 3/2003 | Soh et al. | ...................... | 370/445 |
| 6,594,302 B1 * | 7/2003 | Lansford | ........................ | 375/133 |
| 6,765,882 B2 * | 7/2004 | Rittle et al. | .................... | 370/277 |
| 7,610,036 B2 * | 10/2009 | Teo et al. | ....................... | 455/403 |
| 7,822,420 B1 * | 10/2010 | Schulz | ........................... | 455/447 |
| 7,899,464 B2 | 3/2011 | Gillin et al. | | |
| 2010/0135214 A1 * | 6/2010 | Ishizu et al. | ................... | 370/328 |

OTHER PUBLICATIONS

Extended European Search Report issued in related European Patent Application No. 11250300.8 dated Nov. 29, 2012.
Berlemann, Lars, et al., "Cognitive Radio and Dynamic Spectrum Access", *Cognitive Radio and Dynamic Spectrum Access*, 2009, pp. 145-187.
Gummalla A.C. V. et al., "An Access protocol for a wireless home network", *Wireless Communication and Networking Conference*, Sep. 1999, pp. 1392-1396.
Mangold, Stefan, "Carrier-grade 802.11 operating in paired spectrum", *IEEE-SA Mentor*, vol. 802.11WNG SC, No. 1, May 16, 2012, pp. 1-18.
Mangold, Stefan, "A dual-radio contention-based protocol for paired spectrum access and TV white space", *2012 9th Annual Conference on Wireless on-Demand Network Systems and Services (WONS)*, Jan. 2012, pp. 107-112.

* cited by examiner

*Primary Examiner* — Anh Ngoc Nguyen
(74) *Attorney, Agent, or Firm* — Kilpatrick Townsend & Stockton LLP

(57) ABSTRACT

Systems, methods, and devices for operating a multiplex wireless local area network using separated uplink and downlink channels in the 802.11 and television white space (TVWS) spectra are disclosed. Opportunistic detection and use of available TVWS frequency channels allows for fixed and mobile wireless devices to more efficiently use the available wireless bandwidth. By using separated uplink and downlink channels, a fixed wireless device can listen to incoming uplink frames from other mobile and fixed wireless devices and monitor for uplink frame collisions. In the event of an uplink frame collision, the fixed wireless device can immediately send a stop frame in the downlink channel to all involved wireless devices to avoid lost channel time due to the delay caused by most acknowledgement-based collision recovery protocols. Similarly, communicating mobile and fixed wireless devices can transmit and receive data frames in both directions simultaneously.

19 Claims, 11 Drawing Sheets

| 790-791 | 791-796 | 796-801 | 801-806 | 806-811 | 811-816 | 816-821 | 821-832 | 832-837 | 837-842 | 842-847 | 847-852 | 852-857 | 857-862 |
|---|---|---|---|---|---|---|---|---|---|---|---|---|---|
| Guard band | | | | Downlink | | | Duplex gap | | | Uplink | | | |
| 1 MHz | 30 MHz (6 blocks of 5 MHz) | | | | | | 11 MHz | 30 MHz (6 blocks of 5 MHz) | | | | | |

Fig. 6

CELLULAR WIRELESS LAN WITH FREQUENCY DIVISION MULTIPLEX IN TV WHITE SPACE

CROSS REFERENCE TO RELATED APPLICATIONS

This Nonprovisional Application claims benefit of priority under 35 U.S.C. §119(e) of U.S. Provisional Patent Application No. 61/313,683, filed Mar. 12, 2010, entitled "Cellular Wireless LAN With Frequency Division Multiplex in TV White Space", the entire contents of which are herein incorporated by reference for all purposes.

BACKGROUND

The present invention relates to wireless communications in general and more particularly to communication using multiple frequency channels, spectra or bands.

IEEE 802.11 and other contention-based Wireless Local Area Networks (WLAN) provide low-cost communication systems that help coordinate radio spectrum access for wireless communication systems according to standardized protocols. The 802.11 protocol supports data communication with moderate quality of service requirements using shared radio frequency channels. It was designed to be simple to use, and robust when operating in interference prone environments typical of unlicensed spectra. Such spectra are unlicensed in the sense that compliant devices are free to transmit without previously arranged spectrum or frequency channel assignments.

Accordingly, contention-based protocols are useful in uncoordinated environments, where distributed and independent decision-makers share resources. In wireless communications, one important resource to share by base stations and mobile stations is the available or designated radio spectrum, which is a limited resource. When accessing the available or designated radio spectrum in a distributed way, stations access resources repeatedly for a limited duration, before releasing them again for use by other stations. Transmitting data from a base station to a mobile station is referred to as downlink, whereas communication in the opposite direction is referred to as uplink. Downlink and uplink data transmission in traditional contention-based wireless communication and networking environments typically occur on the same radio spectrum, i.e., the same radio frequencies or frequency channels. Frequency channels sometimes include a block of frequencies in some continuous area of the radio frequency spectrum.

With contention-based protocols, a station waits for a contention period of random duration and, if no other stations begin sending data by the end of that the random wait time, the station will start sending data over the shared frequency channel. However, if another station starts to send data on the shared frequency channel before the end of the contention or wait period, then the station pauses its timer and waits until the spectrum resources are available again, before resuming the contention period count down. Systems that operate in this manner are often referred to as a listen-before-talk or listen-before-send type systems or protocols. Since stations in listen-before-talk systems select random waiting times independently, multiple stations may initiate data exchange at the same time, which is referred to as collision and results in lost data and the undesirable need for re-transmissions. Collision probabilities can be reduced with increasing the contention window at the potential cost of spectrum efficiency. The addition of frequency channels to the available spectrum can alleviate the congestion on heavily trafficked WLANs.

Recently, previously licensed frequency channels have been opened up and made available to unlicensed device and protocols due to changes in certain regulations. For example, TV white space ("TVWS") refers to spectra that were previously licensed to analog television broadcasters, but is now unlicensed following the transition of licensed television broadcasts from analog form to digital form in different frequency ranges. While the use of TVWS will be unlicensed, there are certain requirements for transmitters and receivers in the allocated wireless frequency ranges that are designed to avoid widespread interference in those frequency ranges.

To operate in the newly released TVWS, a TVWS device (TVWD) should be able to detect unused radio frequency channels in which to operate. Channel availability may change dynamically depending on the environment and the original spectrum usage by the primary system. Some rules of using TVWS prohibit emitting radio signals in certain channels, to avoid unwanted interference to primary radio systems such as terrestrial TV receivers that may be located in close proximity. However, the rules regarding listening in a TVWD (i.e., listen, measure signals, or receive data) are more relaxed relative to the rules regarding transmitting, because listening does not normally create interference.

In the United States, the Federal Communications Commission ("FCC") regulates wireless transmissions and other countries have radio regulators as well. As for TVWS, FIG. 1 illustrates the FCC's TVWS regulation. Solid lines indicate permissions for secondary usage of TV channels for fixed or portable TV white space devices (TVWDs). Dotted lines indicate channels that are excluded from TVWS. After the digital transition, channels 52-69 will be used for next generation cellular and for public safety applications. The FCC, in its "Unlicensed Operation in the TV Broadcast Bands" report, describes the regulatory framework for the TVWS. The FCC defines two classes of TVWDs: (1) fixed TVWDs and (2) personal/portable TVWDs. The personal/portable TVWDs operate either under control of a fixed TVWD or autonomously. Different regulatory rules are defined for the two different device classes.

Fixed TVWDs are permitted to operate in the VHF channels except channels 3-4, and on the UHF channels, except channels 36-38. The reason for the exclusion of channels 3-4 is to prevent interference with external devices (e.g., DVD players) that are often connected with shielded cables to a TV utilizing these channels. The exclusion for channel 36-38 is to prevent interference with radio astronomy measurements at channel 37. In FIG. 1, exclusions are indicated by dotted instead of solid lines for fixed and portable services.

The operation of portable TVWDs is even more restricted, because of their potentially nomadic mobility pattern. Portable TVWDs are only permitted to operate in the UHF channels starting from channel 21, and with the exception of channel 37. Portable devices are not permitted on channels 14-20, since some metropolitan areas of the U.S. use some of those channels for public safety applications.

For the different VHF and UHF channels, the proposed regulation defines maximum power levels for the fixed and for the portable TVWDs. Fixed TVWDs are permitted to transmit with up to 30 dBm (1000 mW) and additionally with up to 6 dBi antenna gain, resulting in maximum 4000 mW EIRP. Portable TVWDs are permitted to transmit with up to 20 dBm (100 mW) with no antenna gain. A contour protection requires portable TVWDs to further reduce the transmission power when operating on channels adjacent to active TV broadcast channels. The capability to dynamically reduce the transmission power when possible is required for all TVWDs. In general, the requirements of fixed TVWD devices are more relaxed relative to portable TVWDs. All TVWDs must be able to sense spectrum and identify analogue and digital TV signals (ATSC and NTSC TV signals), plus auxiliary primary signals such as wireless microphones, all at a level of −114 dBm (averaged over a predefined bandwidth).

A central geo-location database controls mechanism of TVWS operations. Permission to access channels is given in a location grid of 50 meter accuracy. All fixed TVWDs must provide accurate geo-location at 50 meter accuracy and database access, as well as for all autonomous portable TVWDs that are not operating under control of a fixed TV WD. In the database, an entire venue such as an entertainment venue or an event can be registered and protected against any secondary TVWS activity. Instead of relying on geo-location with GPS or similar means, for fixed TVWDs, a certified installer can configure the device location during setup. Further, fixed TVWDs must transmit their identities and location information to facilitate their detection in interference scenarios.

FIG. 1 illustrates allocation of regulated channels for 802.11 frequency division multiplexing. This is particularly useful where regulations or technical considerations have distinct rules for fixed and portable channels. In such cases, if the more constraining rules apply to one set of frequencies, such as allowing only transmissions from fixed devices, a downlink from a fixed device might be on that one set of frequencies, whereas the uplink is on a more relaxed set of frequencies.

FIG. 2 illustrates the application of TVWS regulations for three example locations in the U.S. In densely populated areas, such as Market Street in San Francisco (top line) or Wall Street in New York City (bottom line), the number of available TVWS channels are zero or close to zero. In Orlando, Fla., a few free channels are available in UHF and in VHF, but because of the restrictive regulation, none of them would be available for fixed and portable secondary spectrum usage with TVWDs. FIG. 2 also illustrates allocation of channels for frequency division multiplexing using portable devices. In some cases, FDM helps with TVWS operations. In the example shown in FIG. 2, TV channel 9 is used for fixed/downlink traffic and TV channel 28 is used for portable/uplink traffic.

Television broadcast signals are protected with a contour, inside which TV white space devices are not allowed to transmit. Within the protected area defined by the contour, there are special rules for operation on a TV channel adjacent to an active TV broadcast channel. Fixed TV white space devices are not permitted to operate on channels adjacent to TV broadcast channels that are allocated to TV broadcast services. Portable devices are permitted to operate on an adjacent TV channel with the maximum allowed transmission power of 16 dBm (4 dB lower than on non-adjacent channels, i.e., 40 mW).

The release of TVWS is one of the biggest allocations of spectrum for unlicensed use that has been created in recent history. Embodiments of the present invention take advantage of the newly available spectrum to increase the efficiency with which bandwidth in WLANs can be utilized.

SUMMARY

Devices using 802.11 and TVWS spectra coordinate to form a wireless network compliant with one or more 802.11 standard and with one or more TVWS standard and TVWS requirements to form a frequency division multiplex wireless network.

Various embodiments of the present invention include methods for operating a first wireless device as part of a wireless frequency division multiplexed communication system comprising. Such methods include detecting a first unused frequency channel using the first wireless device, transmitting an uplink frame on the first unused frequency channel using the first wireless device, and receiving a downlink frame using the first wireless device, from a second wireless device on a second unused frequency channel independent of activity on the first unused frequency channel. The first unused frequency channel can include an 802.11 frequency channel or a television white space frequency channel, or a frequency channel licensed to a cellular network. In the same way, the second unused frequency channel can include an 802.11 frequency channel or a television white space frequency channel, or a frequency channel licensed to a cellular network.

Other embodiments include methods for communicating between a fixed wireless device and a mobile device. Fixed wireless devices are devices that can be configured to be normally stationary when in use and mobile wireless devices are devices that can be configured to be normally usable while moving or not moving without requiring reconfiguration between moving and not moving. The methods for using such mobile and fixed wireless devices can include operating the fixed wireless device as part of a wireless frequency division multiplexed communication system comprising. The fixed wireless device can detect a first unused frequency channel using the fixed wireless device and then transmit a downlink frame on the first unused frequency. Such methods and systems can also include using the fixed wireless device to detect a second unused frequency channel. The first and second unused frequency channels can include an 802.11 frequency channel or a television white space frequency channel.

Yet other embodiments include a fixed wireless device that can include a transmitter, a receiver and a memory comprising computer executable code. The code in the memory can include instruction for a processor to perform a method for operating a wireless local area network that include using the receiver to detect a first unused frequency channel the receiver and the transmit a downlink frame on the first unused frequency channel using the transmitter.

The following detailed description together with the accompanying drawings will provide a better understanding of the nature and advantages of the present invention.

BRIEF DESCRIPTION OF THE DRAWINGS

FIG. 6 is a chart of harmonized frequency arrangements.

DETAILED DESCRIPTION OF EXEMPLARY EMBODIMENTS

Figure 1:
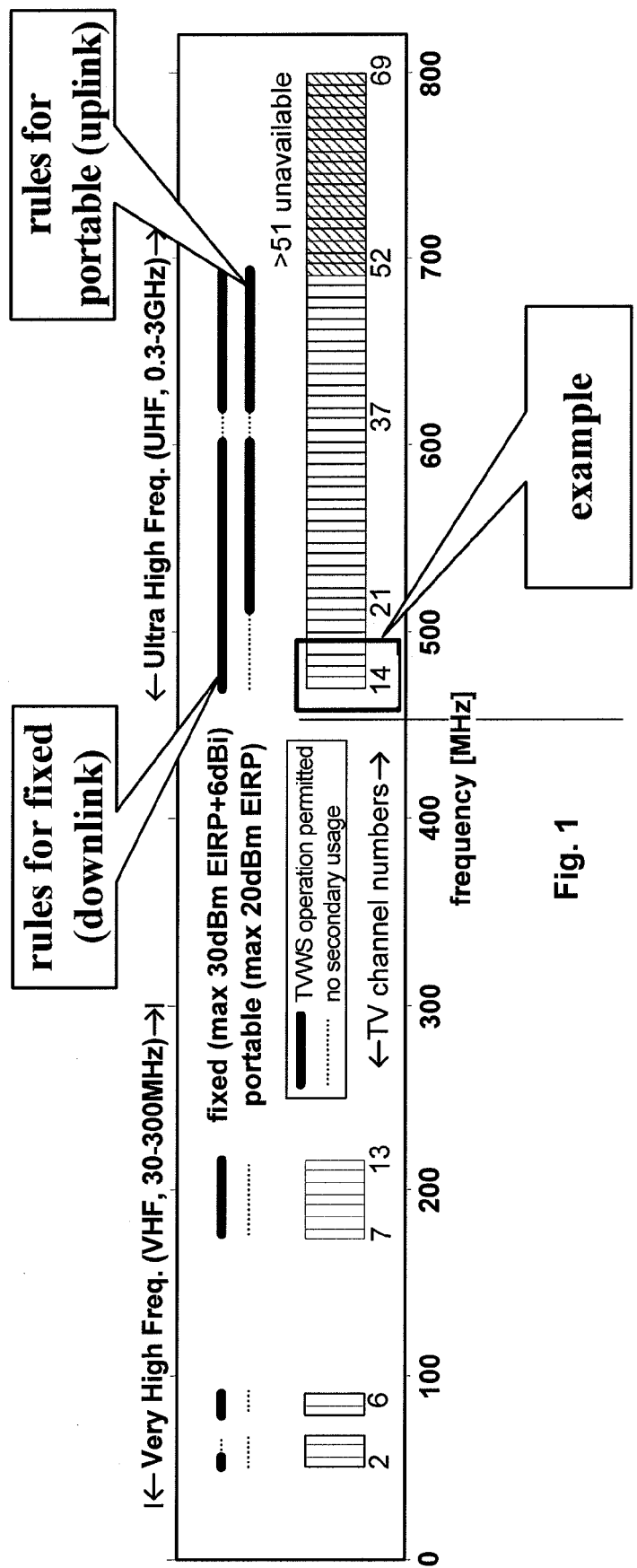
FIG. 1 is a graph illustrating TVWS regulation in the U.S.
Figure 2:
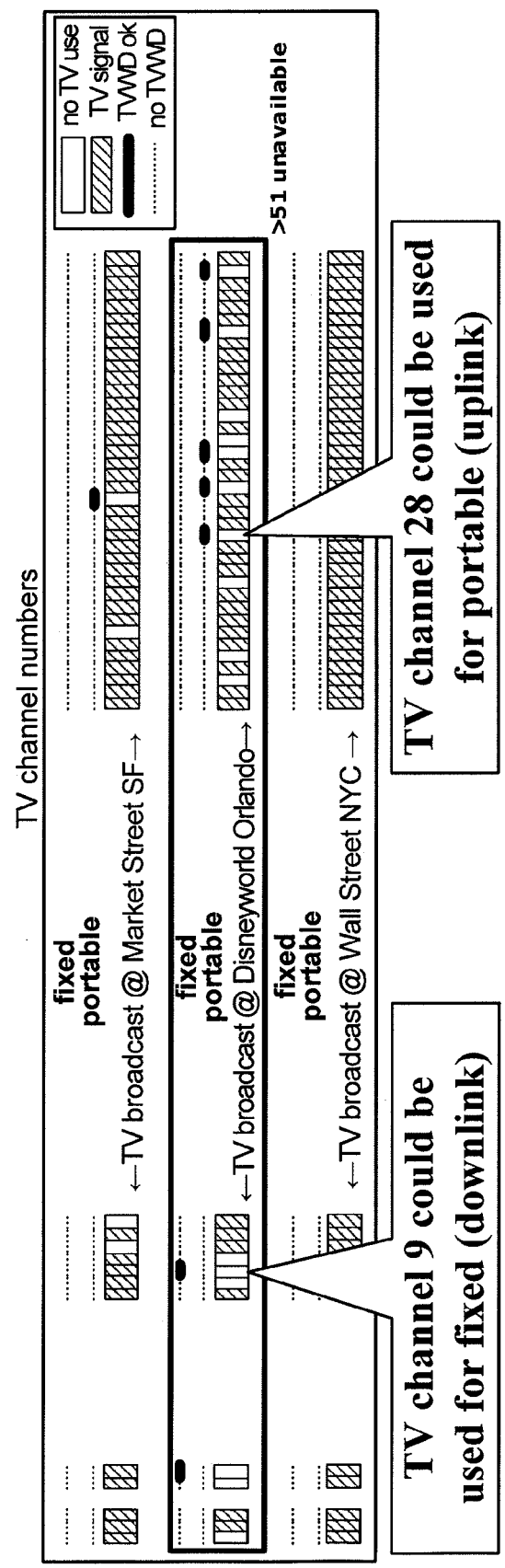
FIG. 2 is a graph illustrating TVWS regulation in example locations within the U.S.

An improved wireless communication system is described herein. According to aspects of the present invention, TVWS can be used with and or incorporated into 802.11 and other wireless protocols in compliance with various regulations in novel ways.

Many wireless networks rely on systems and protocols based on the "Wi-Fi" standard IEEE 802.11 and/or one or more of its subclasses or varieties, e.g., 802.11b, 802.11g, 802.11n, etc. Advantages of using 802.11 based wireless networking and communication protocols include simplicity, reliability, and a wide availability of low-cost implementations and devices. The 802.11 protocols were originally developed for local area network scenarios. Over time, the 802.11 protocol has been modified to support other network topologies and services. For example, personal area networks, sensor-, vehicular-, and broadband access networks can now be supported.

However, there are also services, such as wide-area broadband access and next generation cellular networks, for which different technologies can be used. According to various embodiments of the present invention, existing 802.11 standard protocols can be expanded to use TVWS spectra newly released as a result of the transition from analog to digital terrestrial television transmissions to support cellular/mobile networks and other services. In such embodiments, available frequency channels can be paired to support separated downlink and uplink channels in cellular networks.

In some embodiments, 802.11 based devices can use TVWS to implement frequency division multiplexing. Such devices can be used to implement low-cost and robust wireless networks in TVWS networks and cellular/mobile networks. As such embodiments can include opportunistic spectrum usage in the TVWS, various rules, regulations, or protocols for the protection of original or primary users of the TVWS and TVWS adjacent spectra can be implemented or included in the configuration of the network. The rules, regulations, or protocols can be self policed by the individual devices or can be policed by the central or stationary devices in the wireless network that control the connection to the wide are network, such as the Internet. In other embodiments, variations on existing Media Access Contol ("MAC") protocols can be used in conjunction with the available TVWS frequency channels.

A separation of transmission channels and reception channels can be implemented by extending the existing 802.11 WLAN standard to include Frequency Division multiplexing or Duplexing (FDD) for two-way communication (herein "FDD WLAN"). FDD WLAN can be implemented to use TVWS efficiently, but it can also be used for cellular/mobile environments based on low-cost 802.11 devices operating in a paired spectra configuration. Most of the spectra for cellular/mobile networks is licensed as paired spectra for FDD with dedicated uplink and downlink radio spectra. Broadband cellular networks used in planned future expansion of these networks, the so-called Long Term Evolution (LTE) networks, can use FDD but it can also be used for cellular/mobile environments based on low-cost 802.11 devices operating in a paired spectra configuration. Most of the spectra for cellular/mobile networks is licensed as paired spectra for FDD with dedicated uplink and downlink radio spectra. Broadband cellular networks used in planned future expansion of these networks, the so-called Long Term Evolution (LTE) networks, can use FDD.

Downlink-Uplink Frequency Channel Separation

The IEEE 802.11 Medium Access Control (MAC) protocol is the most popular example of contention-based resource sharing protocol (set out in "P802.11, IEEE Standard for Wireless LAN Media Access Control (MAC) and Physical Layer (PHY) Specifications," November 1997) (hereinafter "P802.11"). The simple and low-cost nature of the IEEE 802.11 protocol is one reason for its wide acceptance. IEEE 802.11 was built to operate in spectrum where downlink and uplink use the same radio spectrum. In contrast, many of today's radio systems are regulated in a way that requires separation of downlink and uplink frequencies.

Some radio systems where this is the case are cellular networks such as Long Term Evolution (LTE) and mobile WiMAX. As an example, the *European Conference of Postal and Telecommunications Administrations (CEPT)* regulation for LTE or WiMAX (*"Technical Considerations Regarding Harmonization Options for the Digital Dividend in the European Union—Frequency (Channeling) Arrangements for the 790-862 MHZ Band,"* Tech. Rep. 31 (October 2009) provided for LTE at around 800 MHz comprising a 1 MHz guard band (790-791 MHz), six 5 MHz downlink bands (792-821 MHz), an 11 MHz duplex gap (822-832 MHz), and six 5 MHz uplink bands (733-862 MHz).

One particular family of radio and wireless communication systems that can be improved from downlink-uplink separation according to various embodiments of the present invention include cognitive radio for opportunistic secondary spectrum usage (L. Berlemann and S. Mangold, *Cognitive Radio and Dynamic Spectrum Access*, John Wiley and Sons, 2009), including the new TV White Space (TVWS) ("FCC 08-260 (2008), Federal Communications Commission, Second Report and Order and Memorandum Opinion and Order").

One reason why cognitive radio and TVWS should gain from downlink-uplink separation is related to flexible spectrum management and another reason is related to the regulation for opportunistic usage of digital TV channels. The more flexible spectrum management comes from the fact that when uplink and downlink are free to independently use whatever frequency is available, the potential interference on incumbents can be limited.

Some incumbent usage for digital TV broadcast are possible, in that some TV channels are unused and hence potential candidates for TVWS. The regulation for TVWS however requires three consecutive channels to be unused for downlink transmissions, which limits the secondary usage. *Federal Communications Commission, Second Report and Order and Memorandum Opinion and Order*, (FCC 08-260 (2008)), hereinafter "FCC 08-260". Such channels might not be available for uplink traffic from mobile stations, referred to as "portable" in FCC 08-260, as only higher channels are allocated to mobile stations. As a result, communication would only be possible with downlink-uplink separation.

In general, for those cases where spectrum holes are detected by or provided to cognitive radios, it is rarely the case that the spectrum holes of base station and mobile stations overlap on the same channel. The traditional listen-before-talk 801.11 protocol requires all stations, including base station and mobile stations to operate on the same frequency. As a result, for the most frequently encountered real world scenarios, no communication is allowed because there is no common channel available for transmitters and receivers to exchange packets, even though base stations and mobile stations have found their own frequency holes which could allow them to transmit separately. Therefore, under such situation, a protocol which could assist separation of uplink and downlink is needed, i.e., allowing transmitters and receivers transmitting on different frequencies.

Figure 3:
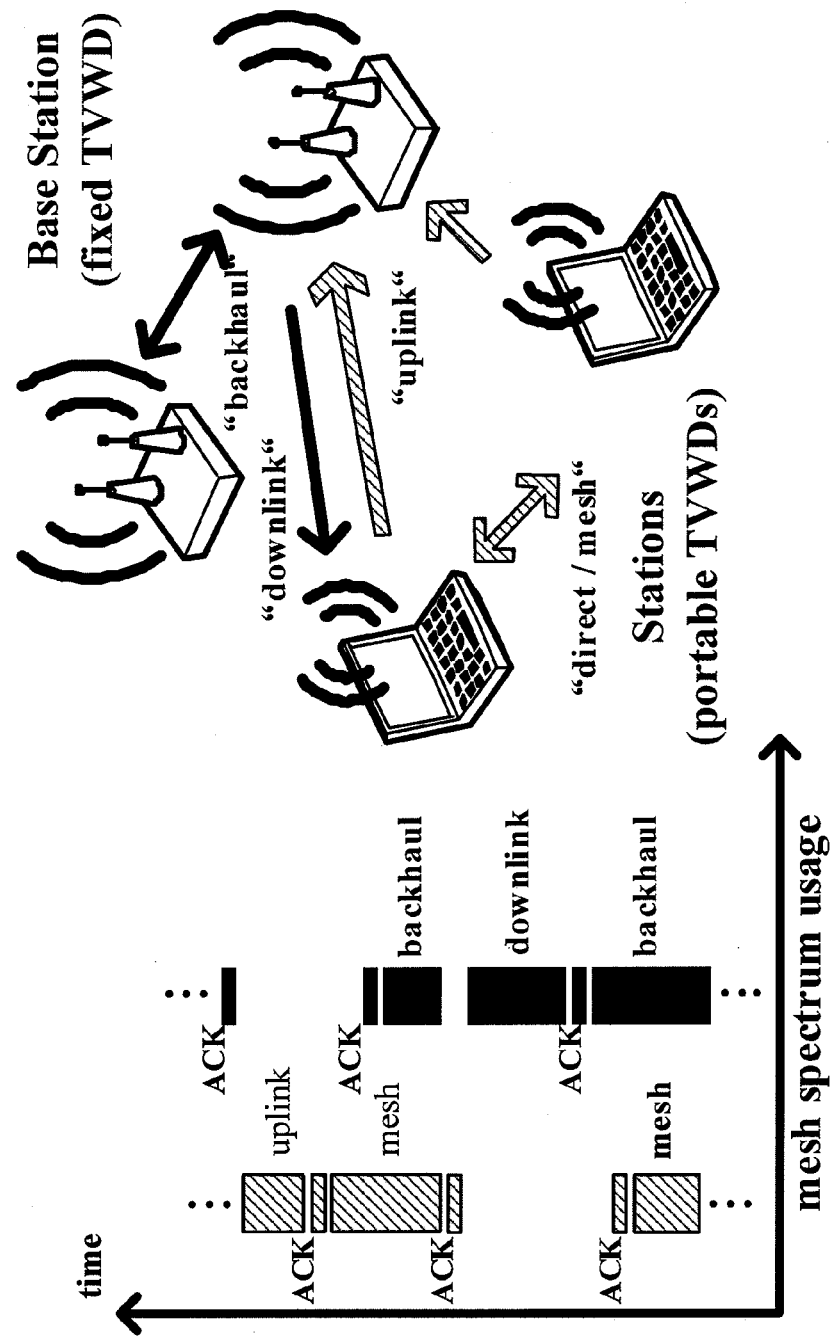
FIG. 3A illustrates how a mesh spectrum would be allocated over time in one example.
FIG. 3B illustrates an example wireless LAN operating with frequency division duplex (FDD).

FIGS. 3A and 3B illustrate paired spectra access according to various embodiments of the present invention. FIG. 3A illustrates how a mesh spectrum can be allocated over time, according to various embodiments. FIG. 3B illustrates how different mesh spectra might be used for within an wireless network.

With FDD WLAN operating in a mesh mode, the listen-before-talk protocol of 802.11 can be modified to operate on two channels instead of one. Devices like 802.11 access points or fixed TVWDs can be configured to operate as base stations and can transmit on one or more downlink frequency channels in one or more available downlink spectra, while other devices, such as 802.11 mobile stations or portable TVWDs, can be configured to operate as mobile devices and transmit on one or more uplink frequency channels in one or more of the available uplink spectra back to what is commonly referred to as a "base station." When one or more downlink channels are used by the fixed station, then the fixed station can alternate between transmitting downlink frames on the one or more downlink channels. Similarly, mobile devices within the same area that has multiple unused uplink channels can use different uplink frequency channels. For example, one mobile device might find an unused uplink channel at one channel in the TVWS, while another mobile device might find an unused uplink channel at another channel. The two mobile devices can then transmit over the respective uplink channels to the fixed station which can receive transmission over both uplink channels.

In other embodiments, direct communication between devices is possible. In direct communication, portable TVWDs can communicate with one another via one or more uplink frequency channels in one or more of the available uplink spectra. Similarly, as indicated in FIG. 3B, fixed TVWD and mesh points can send backhaul data communications over one or more downlink frequency channels in one or more available downlink spectra or channels.

With full duplex FDD, devices can transmit/receive in parallel, at the same time. With half duplex FDD, devices either transmit or receive, but never at the same time. In cellular networks, base stations are traditionally configured to support full duplex, whereas portable devices are often only configured to operate in half duplex mode. Embodiments of the present invention can include modifications and improvements of existing 802.11 protocols for FDD WLAN support. Such modifications are described by way of examples. Such example are not intended to limit the scope of the present invention in any way.

Various embodiments can include fixed TVWDs operating exclusively on dedicated frequency channels. Legacy 802.11 protocols can require all devices, including the access points, to contend for spectrum access. In networks that use such protocols, each device performs a listen-before-talk process for collision avoidance before initiating data frame exchanges. With FDD WLAN improvement to such networks according to various embodiments, a network operator can configure its network by assigning dedicated frequency channels to one or more fixed TVWDs, i.e., to its base station. In such embodiments, collision avoidance is not needed, because the base stations can operate independently without the need for collision avoidance. Such base stations can transmit at any time using the downlink frequency channel whenever, without the need for a contention protocol to be used because there is never any other traffic on the dedicated downlink frequency with which to contend. Implementations of such embodiments would thus have the advantage of using the bandwidth more efficiently.

In related listen-before-talk implementations, devices transmitting in the uplink direction inevitably have full or partial data frames collide when two or more devices choose to initiate frame exchanges at the same time on the uplink frequency channel. When this happens, such stations typically transmit entire data frames and then wait for an acknowledgement that the data frame was received successfully. When an acknowledgement frame is not received from the intended recipient device, then the devices that were transmitting on the uplink can determine that the transmitted frames collided or otherwise failed to reach the intended recipient device. Devices can reduce the probability of collision to some extent by randomizing the starting point of a frame exchange interval. With FDD however, and assuming full duplex devices, a base station can detect, determine or identify data frame collisions at the base and transmit or signal a collision detection frame or alert to the device from which the colliding data frame originated and request immediate end of transmission.

In some embodiments, the request to resend the data frames that were determined to be colliding can be contained in the collision detection frame or alert, while in other embodiments, the collision detection frame or alert can be separated from the request to resend the data frames that collided. Such signaling can use a frame transmitted via the downlink frequency channel. Since the time period spent transmitting an entire data frame is longer than the time period needed to receive a collision alert, usage of the wireless spectra can be used more efficiently. The transmission of data frames that are determined to be colliding can be stopped before the complete data is sent. In such embodiments, the fixed or stationary wireless device can send a stop frame in the downlink direction. Thus, in networks configured according to such embodiments, the extra time save on the particular uplink frequency channel can be used for other transmissions, whereas in legacy networks, that time on the uplink frequency can is typically wasted.

Zero Acknowledgement Uplink Transmission

In some embodiments, a result of the described ability for early data frame collision detection, acknowledgement frames might not be needed at all in the uplink direction. A device can transmit a row of frames to an associated base station, for example, frames n, n+1, n+2, . . . n+x. In the event that frame n+1 does not reach the base station due to bad channel conditions, the base station can detect that a frame is missing no later than when it receives frame n+2 after frame n. The associated or intended recipient base station can request that the transmitting device selectively retransmit frame n+1 out of sequence.

Half Duplex Portable TVWDs and Full Duplex Fixed TVWDs

In other embodiments, to reduce complexity of portable TVWDs, the portable TVWDs can operate in half duplex FDD instead of full duplex. Various changes in the configuration of the existing protocols or networks can be made to ensure that the base station only transmits when portable TVWDs are receiving and not transmitting. In such embodiments, the base station can use a listen-before-talk protocol.

Figure 4:
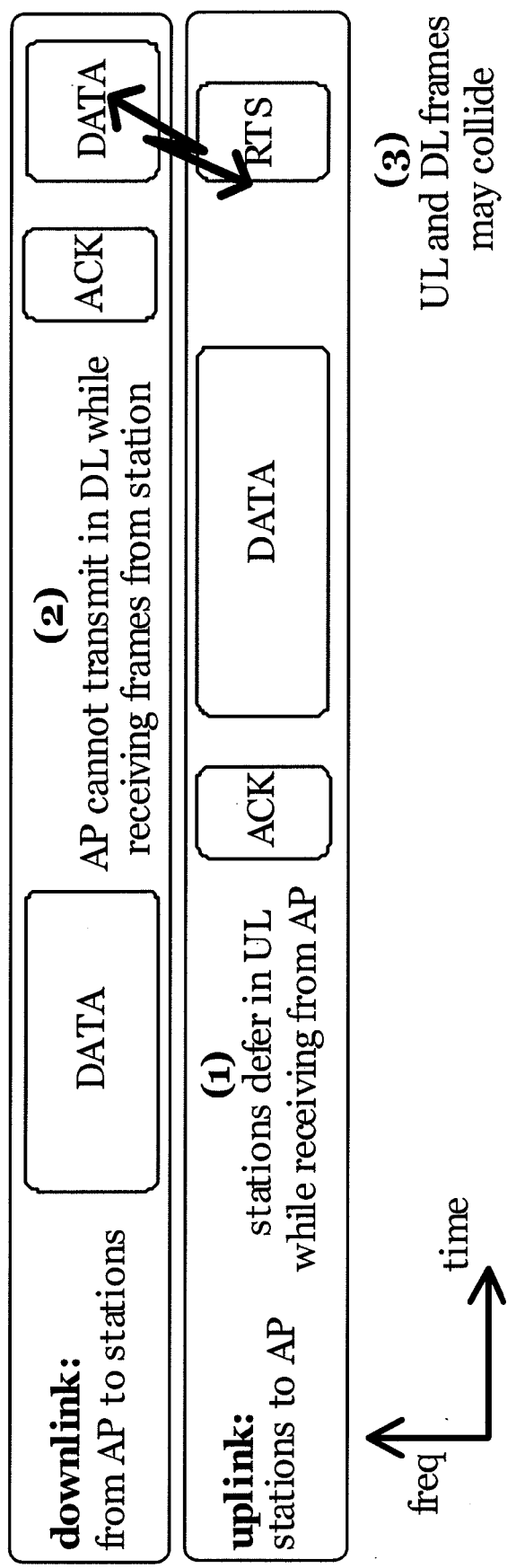
FIG. 4 illustrates an example of simple half-duplex on a single frequency-channel.

FIG. 4 illustrates an example of simple half-duplex on single channel or frequency spectra. As shown, there are two data communication directions, i.e. uplink ("UL") and downlink ("DL") directions. Accordingly, frames sent in the UL direction can be referred generically as uplink frames, while frames sent in the DL direction can be referred to generically as downlink frames.

Each of these data directions can be transmitted on the same frequency channel. In such embodiments, the access point ("AP") can transmit data frames to the stations, mobile or otherwise. When the AP is transmitting data frames, the mobile station will stop transmitting frames in the UL direction to avoid collisions. When the AP is done transmitting the data frame it can enter into a listen-before-send mode in which is monitors the uplink data traffic to determine if a mobile station is transmitting. Once the entire data frame is received from the AP, the mobile station can send an ACK frame to signal to the AP that the data frame was received successfully.

Optionally, after the mobile station is done sending the ACK frame, it can send its own data frame or an uplink frame, and then wait for an ACK frame from the AP. While the mobile station is transmitting in the UL direction, the AP will not transmit in the DL direction. That is, the AP will not transmit will it is receiving data from the mobile station. However, in such embodiments, the mobile station does not enter a listen-before-talk mode after it completes sending data in the UL direction, rather it will just send data whenever it is next necessary. Meanwhile, the AP is in listen-before-send mode can observe that the frequency channel is not being used and thus can begin sending another data frame in DL. As shown, because the mobile station is not in a listen-before-send mode, a collision can occur between the data frames being sent from the AP to the mobile station when the mobile station starts to transmit in the UL direction. To recover from this situation, embodiments can use traditional collision recovery and resend requests sent from the AP to the mobile station. The situation shown in FIG. 4 illustrates how half duplex systems try to emulate full duplex communication using time division multiplexing can still include data collisions.

Figure 5:
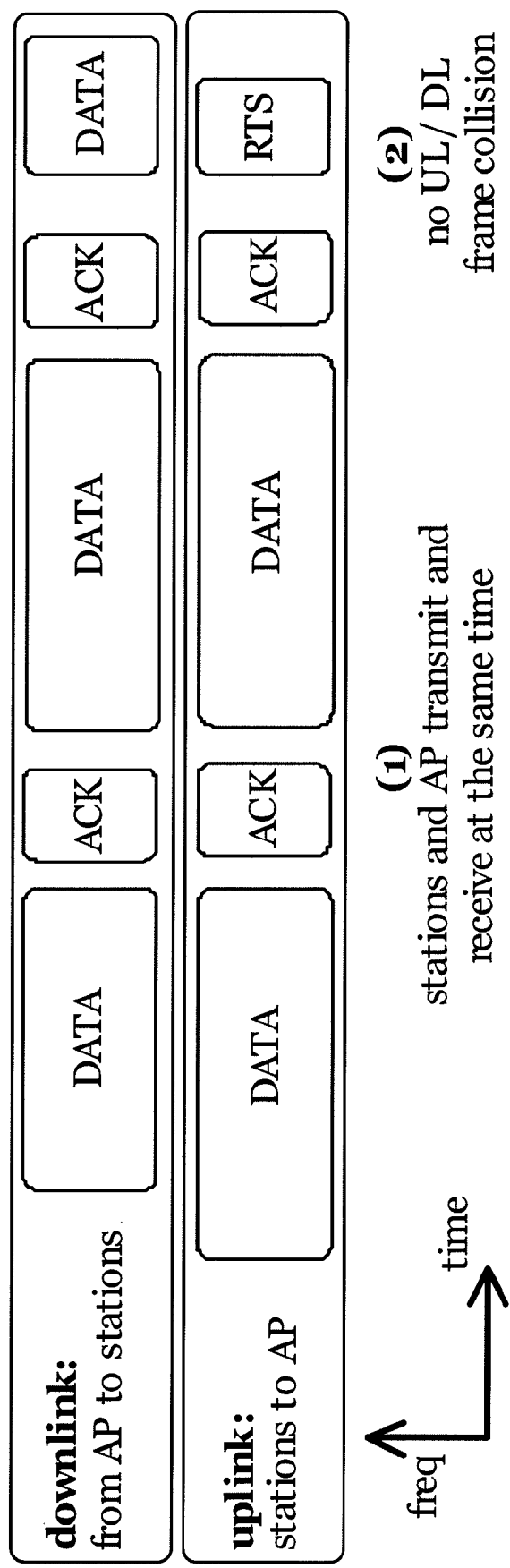
FIG. 5 illustrates an example of full-duplex with dual frequency channels.

FIG. 5 illustrates an example of full-duplex with a dual frequency channel or spectra embodiment of the present invention. When the UL and DL frequency channels are separated and each device, i.e. the mobile station and the AP, can transmitted and receive on each channel independently, the data sent and received by each device does not collide, thus saving time and resulting in a more efficient use of each frequency spectra or channel. No time is wasted resending lost data frames. As shown, in FIG. 8, the AP and the mobile station can simultaneously send and receive data, ACK and other frames and packets.

Operation in TV Spectrum Together with Unlicensed Spectrum Such as 2.4 GHz ISM Band, or 5 GHz U-NII Band, or Other Unlicensed Spectrum For the TVWS, protecting primary systems such as wireless microphones is a concern of the regulators. Whereas opportunistic spectrum usage by fixed TVWDs can be controlled using the geo-location-and-database approach, portable TVWDs may cause unwanted interference. With FDD WLAN, nothing is hindering network operators from having portable devices transmit in unlicensed spectrum, for example at 2.4 GHz only, while receiving data from fixed base stations via TVWS spectrum. This combination with the ISM band is interesting for the connected toys use case illustrated in FIG. 7(a). It is also possible to have multi-band operations (TV White Space & LTE in UHF spectrum).

FIG. 6 is a chart of harmonized frequency arrangements with which paired spectra multiplexing according to various embodiments of the present invention can be implemented using TVWS frequencies. As shown, the downlink frequency channels can be located in the 791-821 MHz range, which is a 30 MHz wide range. That range for downlink channels can be separated into six (6) 5 MHz channels or blocks that can each individually be used for a downlink channels. The downlink channels or spectra can be separated from the uplink frequency channels or spectra. As shown, the uplink frequency channels can be located in the 832-862 MHz range and similarly separated into six (6) 5 MHz channels or blocks that can each individually be used for a uplink channels. The downlink channels and the uplink channels can be separated by an 11 MHz multiplex gap between the 821-832 MHz frequencies. This separation can help avoid cross talk and interference between transmissions on the downlink and uplink channels.

Usage Scenario: Densely Populated Public Venues and Connected Toys

Figure 7:
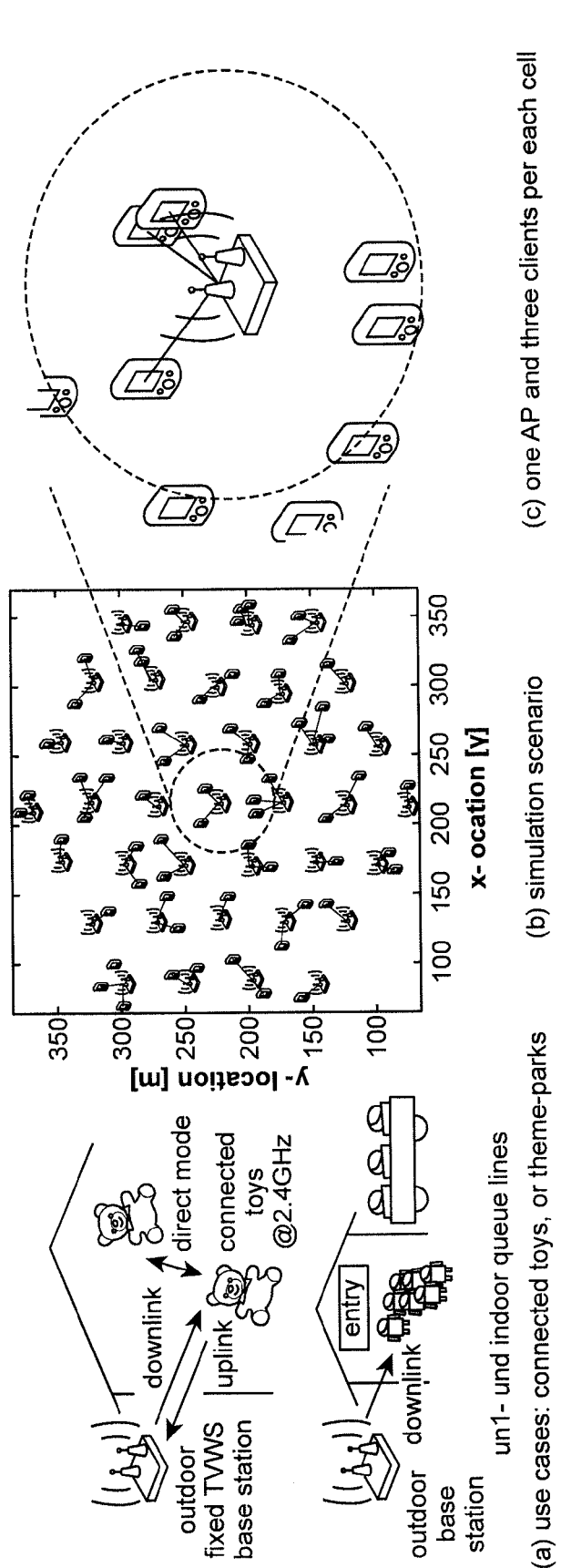
FIG. 7 illustrates various use cases and simulation scenarios.

FIG. 7 shows various embodiments of the present invention that can include two applications of low-cost cellular Wi-Fi networks. As illustrated in FIG. 7(a), one embodiment can include wireless coverage for theme parks and other public venues in which guests queue in front of an attraction or gather for events. In such embodiments that use a TVWS spectrum, low-cost wireless networking coverage of localized indoor and outdoor areas is economically and easily achievable. The combination of TVWS with ISM band can also be applied to wireless enabled toys to enable toy-to-toy communications, as well as provide wireless access to the wide area network or local area network.

FIGS. 7(b)-(c) illustrate the related cellular simulation scenarios, with a proposed protocol for duplex data transfer with multiple priority streams (referred to as "access categories, AC" in 802.11). For each of the three stations per cell or base station shown, a duplexed data traffic pattern (uplink and downlink) can be modeled. To evaluate the system performance in saturation, all stations always attempt to transmit data, i.e., queues are never empty. Frame size is uniformly distributed from zero bytes to 2000 bytes. All clients remain at their randomly chosen position within the cell coverage area. It has been observed that no channel errors occur when communication is at distances smaller than 60 meters.

An extension to the existing 802.11 standard towards support of cellular/mobile networks has various advantages and can facilitate using 802.11 for wide-area broadband access applications and implementations using the TVWS. Introducing frequency division multiplex to 802.11, which is a spectrum access scheme well established in cellular networks, can provide numerous benefits. In particular, using TVWS in conjunction with 802.11 can provide low-cost alternative networks to existing approaches for LTE. Deployment of LTE can include FDD WLAN.

According to embodiments of the present invention, all TVWD can be configured to listen, to measure, or to receive data in all radio channels of the TVWS spectra, because receiving radio signals does not create interference in the transmitting operations. This may create an opportunity for more reliable and controlled communications using separated transmission channels from reception channels. TV white space could be used with increasing reliability and protection of primary services. This is an improvement over existing 802.11, which is a protocol that uses the same channel to transmit and receive and uses a listen-before-talk approach.

The TV white space is one of the biggest allocations of spectrum for unlicensed use the FCC has ever issued. It presents a unique opportunity to create low cost high performance systems.

By extending existing implementations that use 802.11 protocol with paired spectra multiplexing, various advantages associated with and improvements on 802.11 wireless networks can be achieved. Communication and networking protocols according to various embodiments of the present invention can be used in cognitive radio scenarios, and for future cellular networks such as, but not limited to, LTE, fourth generation, WiMAX.

Basic Operation in Paired Spectra

Figure 8:
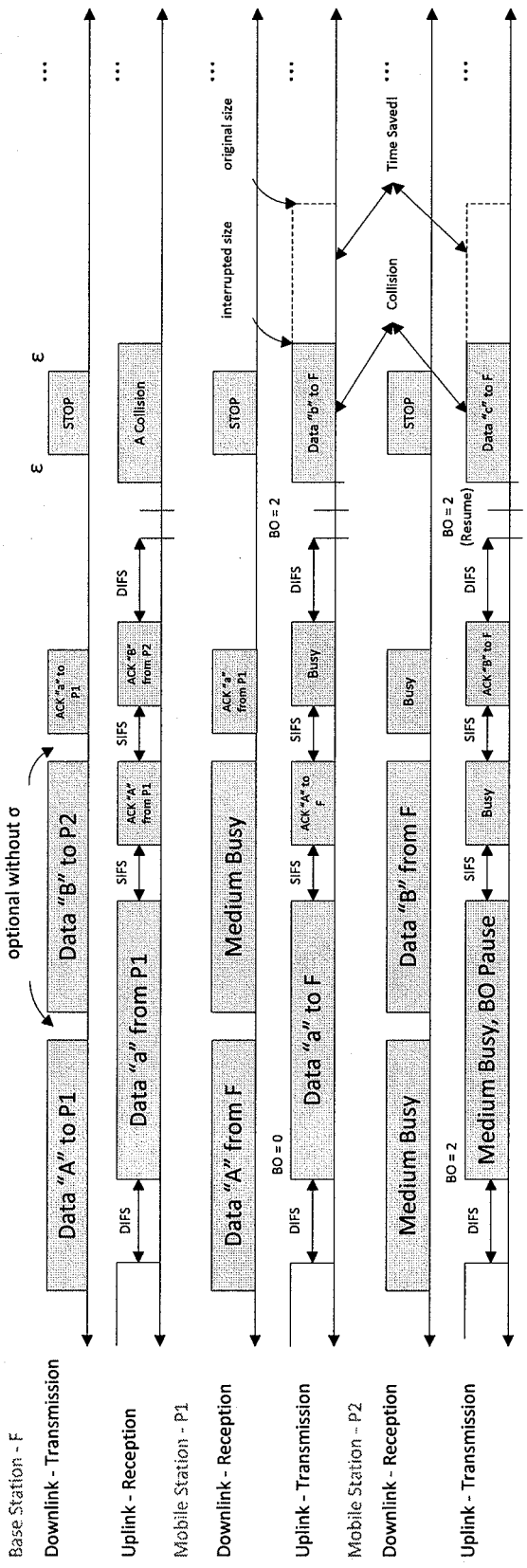
FIG. 8 illustrates a typical sequence as might occur for transmissions using paired spectrum.

The basic operation of an exemplary implementation using a communication protocol with paired spectra multiplexing according to various embodiments of the present invention is shown in FIG. 8. The example shown in FIG. 8, includes one base station—the traditional base station F, and multiple mobile stations—the traditional mobile stations P1 and P2. The base station F can include various wireless enabled networking devices and systems. For example, base station F can include a wireless network access point, a wireless bridge, a wireless router, or a combination device that includes a networking device connected to a wireless transmitter, receiver, or transceiver. Extensions to multiple stations, mobile and stationary, should be apparent to one of ordinary skill in the art.

Each station, both base and mobile, can operate on two different frequency channels simultaneously. For example, each station can choose one frequency channel as an uplink channel and another frequency channel as a downlink channel. As used herein, downlink refers to the direction of data transmission in which the base station transmits data to the mobile stations or devices. Data sent in the downlink direction can include Data frames and acknowledgement ("ACK") frames. Similarly, uplink refers to the direction of data transmission in which the mobile station transmits data to the base station or other mobile devices. As with the downlink, data sent in the uplink direction can include Data frames and ACK frames.

As shown in FIG. 8, the base station F can listen/receive on the selected or designated uplink frequency channel, because receiving radio signals typically does not generate interference on the downlink, or outgoing data transmission, frequency channel. Similarly, mobile stations P1 and P2 can also listen/receive on the selected or designated downlink spectrum because do so does not cause interference on the uplink, or outgoing data transmission, frequency channel. The separation of uplink and downlink frequency channels amongst and between TVWS and other radio frequency channels, such as Wi-Fi and cellular, provides for a number of advantages in embodiments of the present invention.

In some embodiments, like the one shown in FIG. 8, there is only one station using the downlink frequency channel, i.e., base station F. Since there is only one base station using the downlink frequency channel, base station F can transmit or queue Data frames ACK and frames immediately on the downlink frequency channel, regardless of the data traffic that it detects, determines or observes on the uplink frequency channel, without any need for contention control protocols. For example, base station F can send Data "A" to mobile station P1 on the downlink frequency channel, while simultaneously receiving Data "a" from P1 on the uplink frequency channel. Although there is only one base station transmitting on the downlink frequency channel, an ACK frame from the mobile stations via the uplink frequency channel in response to data frames sent via the downlink frequency channel can still be used. Although data frame loss due to collisions is avoided in various embodiments, sending ACK frames from mobile stations to the base station is beneficial in some embodiments because a data frames can still be lost due to other network environment conditions, such as a bad channel condition. However, other embodiments can still operate efficiently without using ACK frames.

An empty time slot or gap σ can be inserted between each data frame or packet, as illustrated in FIG. 8. Such empty time slots or gaps σ can be useful in avoid bad channel condition such as cross talk between the end of one data frame and the beginning of another data frame.

The uplink frequency channel used by mobile stations P1 and P2 can use a 802.11-like Carrier Sense Multiple Access/Collision Avoidance ("CSMA/CA") contention control protocol. A station with a new packet to transmit can monitor the physical medium, i.e. the uplink or downlink frequency channels, continuously. If the medium is idle for a period of time equal to threshold time period according to Distributed Inter Frame Space ("DIFS") protocol, the station can generate a time period and then start a back-off counter based on that time period and to establish a count down for the purpose of collision avoidance. When the back-off counter reaches zero, the station can then transmit a frame.

In some embodiments, when one station detects, determines or observes a transmission from another station on the uplink or downlink frequency channel before its back-off counter reaches zero, the station can stop its back-off counter and wait until it detects, determines or observes another DIFS on uplink or downlink frequency channel, and then resume the count down. Alternatively, if the channel is determined to be busy, either at the start of detection, determination, or observation or during the DIFS time period, the station can continue to monitor the channel until it detects, determines, or observes an idle for a DIFS time period threshold. The choice of the back-off counter scheme can be the same as it is in traditional 802.11 protocols, such as an exponential back-off counter scheme.

After each DIFS time period, the back-off counter can be uniformly chosen from the rage (0, w−1), where w is called Contention Window ("CW"). The value for w depends on the number of unsuccessful transmissions of a data frame or packet. At the first transmission attempt, w is set equal to $CW_{min}$. After each unsuccessful transmission attempt, w is doubled, up to a maximum value $CW_{max}=2^m CW_{min}$, where m is the maximum back-off stage a packet can take. The values of $CW_{min}$ and $CW_{max}$ are specified in the standard, and are physical medium or spectrum specific.

To ensure a data packet or frame eventually get delivered to the intended recipient, a positive ACK frame can be transmitted back from the intended recipient to signal to the sending device a that data packet or frame was received. The ACK frame can be transmitted back immediately at the end of the packet after a time period equal to Short Inter Frame Space ("SIFS"). As a SIFS can be shorter than a DIFS, no other station will be able to transmit until the end of the ACK frame. If the transmitter does not receive the ACK within a time period equals $T_{ACKTimeOut}$, or it detects a new packet transmission on the channel, it then reschedules a packet retransmission, as specified by P802.11; also shown by B. Walke, et al., IEEE 802 Wireless Systems, John Wiley and Sons, 2006; G. Bianchi, "Performance analysis of the ieee 802.11 distributed coordination function," Selected Areas in Communications, IEEE Journal on, vol. 18, no. 3, pp. 535-547, mar 2000.

According to various embodiments, the communication protocol on the uplink frequency channel can be the same as the traditional 802.11 two-way handshaking basic access mechanism. However, in other embodiments, a four-way handshaking RTS/CTS Access mechanism can also be easily implemented. While details of 802.11 protocols are described above, the various embodiments of the present invention can also be useful for improving and modifying other similar contention-based communication protocols.

Uplink Collision Detection

Although with the Collision Avoidance ("CA") technique of the traditional 802.11 listen-before-talk protocol can be used in the uplink channel, frames can still collide when stations choose to initiate data frame exchanges at the same time. When this happens in implementations that do not have a separated feedback or downlink channel, the transmitting stations will continue to transmit the entire frames and then wait for an ACK frame. Only when the ACK frames are not received can such stations determine that a collision has occurred. In embodiments that used paired uplink/downlink frequency channels, the receiving base station can detect the data frame or packet collisions on the uplink channel as they occur and immediately send an interrupt or stop frame to the transmitting devices via the downlink channel, as illustrated in FIG. 8.

As shown in FIG. 8, the time interval for base/mobile stations to respond after detecting a collision is equal to $\epsilon$. By enabling collision detection according to embodiments of the invention, the average time that an uplink channel is occupied by a collision can be reduced significantly. It is important to notice that the uplink collision detection protocol can be used in conjunction with ACK frames. The ability of a station to determine a collision can depend on the instantaneous uplink and downlink channel conditions, and therefore in various situations can benefit from the use of an ACK frame to indicate that no other errors have occurred. For example, if the uplink or downlink channel is not chosen correctly, i.e. it is too close to another channel that is currently being used by a licensed or unlicensed device, then it is possible for data sent on the channels to experience undesirable interference that can corrupt or drown out the data signal. In such situations, using ACK frames sent from the intended recipient device or station can increase the confidence of the transmitting station of device that the data was delivered/received properly and intact.

Figure 9:
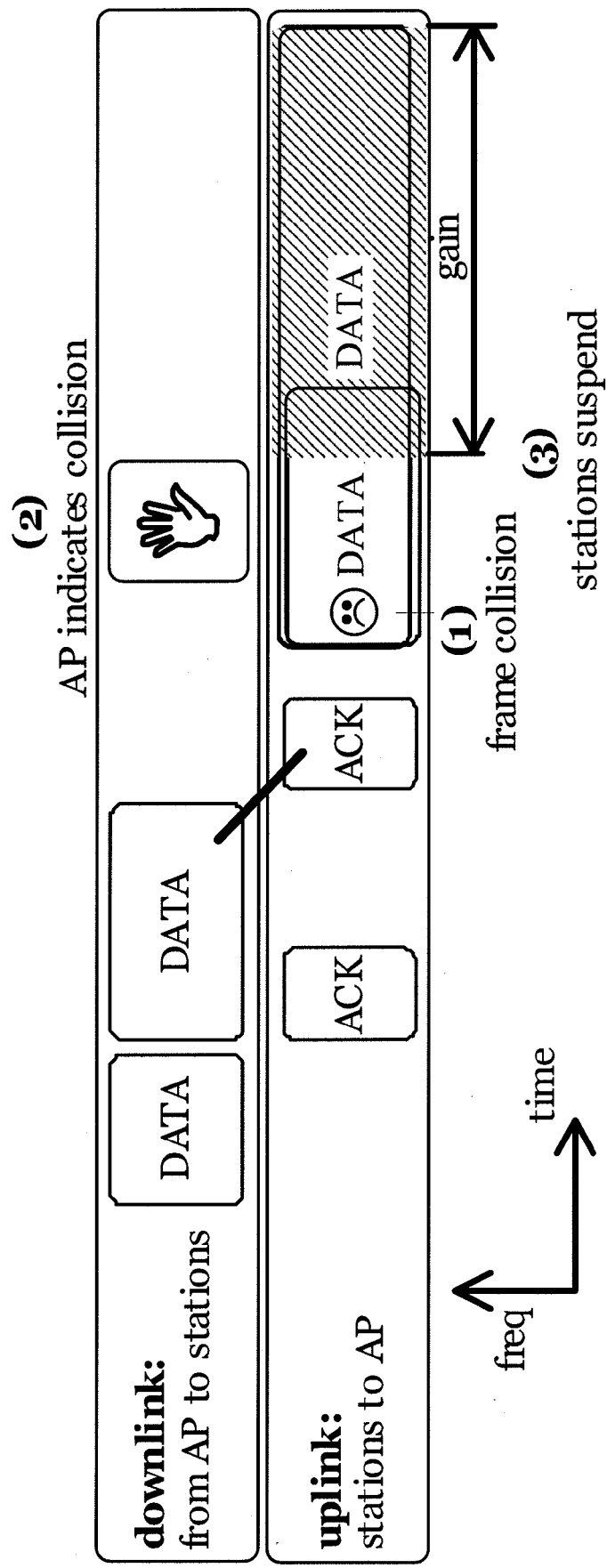
FIG. 9 illustrates the use of radio with uplink collision detection and feedback.

FIG. 9 illustrates the use of radio with uplink collision detection and feedback. Note that when an AP signals a collision, the uplink stations can just stop transmissions, making it so that the system resets faster. This allows for more efficient protocols as well as potential for improvement for cross-layer performance with TCP. However, it can be more complex.

Figure 10:
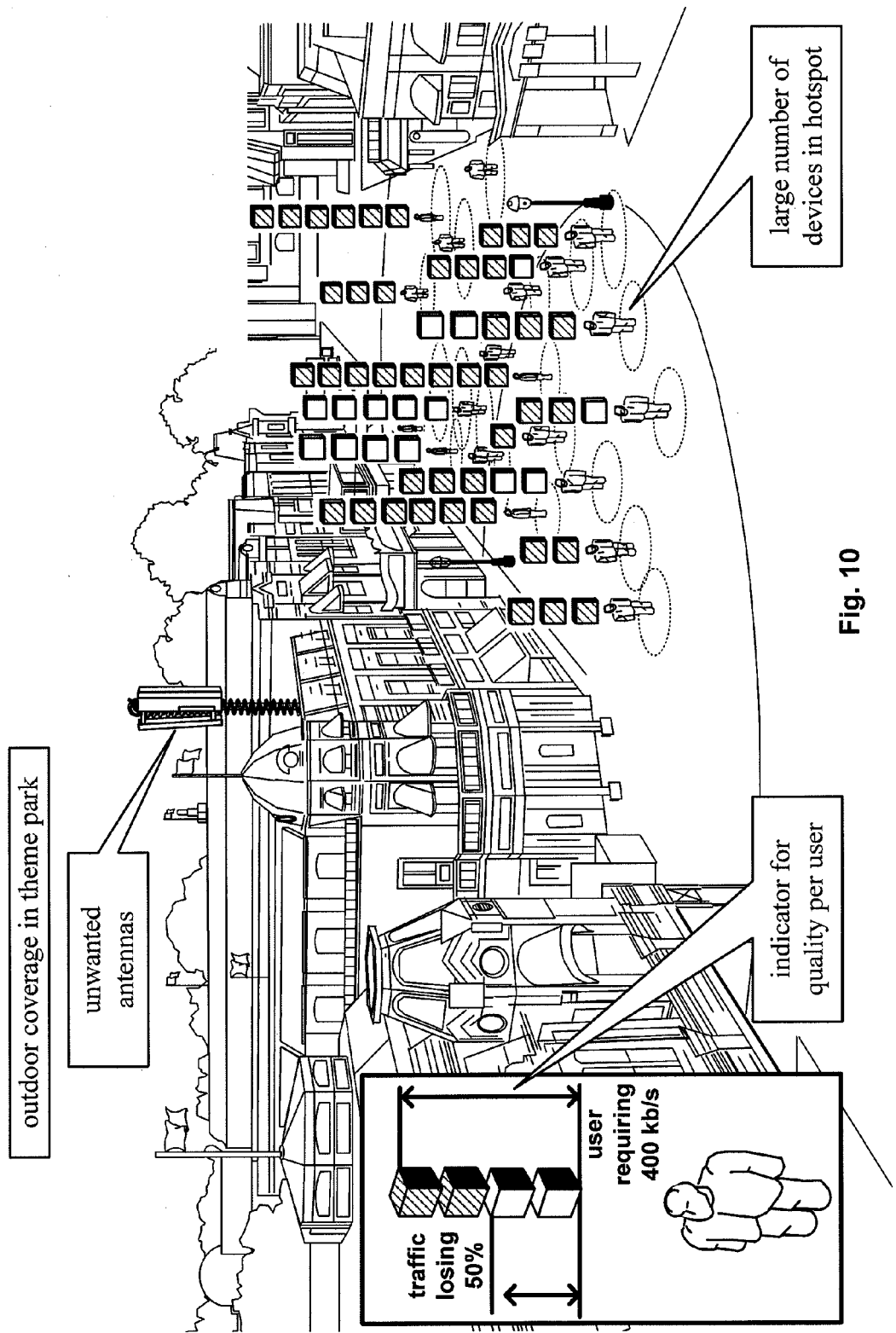
FIG. 10 illustrates an example an environment wherein aspects of the present invention might be used.

Some embodiments of the present invention can include methods and apparatuses that can be suitable for many types of communications, including mobile-device to mobile device communication, such as toy-to-toy data exchange, and various large-scale communication networks in hotspot areas such as public venues, stadiums, concert pavilions and entertainment theme parks that typically attract a large numbers of guests using various cellular and wireless data communication devices. Separating the uplink and downlink channels using various available spectra, such as the TVWS spectra, the efficiency of exiting wireless communication and networking equipment can be extended to avoid the addition of additional and unwanted antennas that might be undesirable for aesthetic, practical, or economic reasons. For example, FIG. 10 illustrates how a theme park might want to include various embodiments of the present invention to avoid the addition of unsightly antennas in environments that are highly stylized or period replicas.

Figure 11:
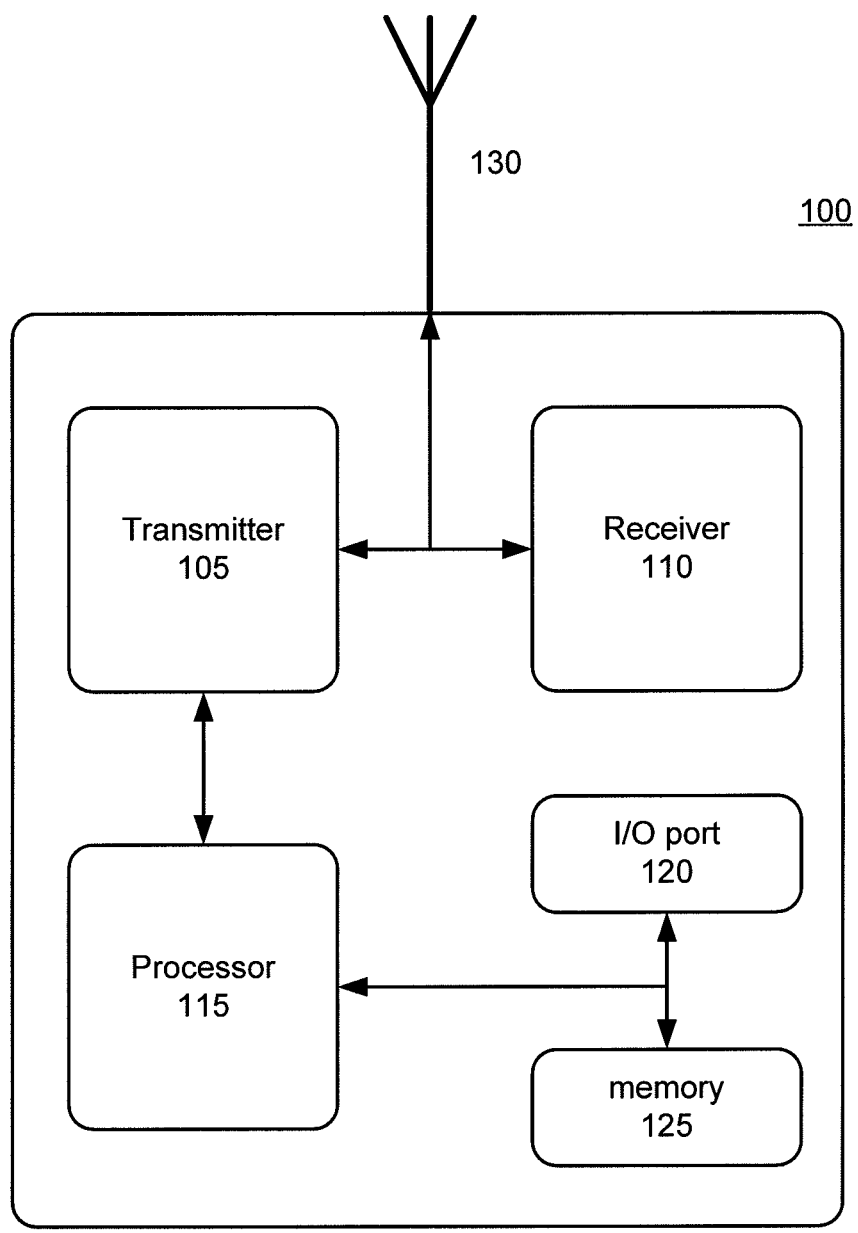
FIG. 11 illustrates a schematic of a wireless device that can be used to implement various embodiments of the present invention.

FIG. 11 is a schematic of a wireless device 100 that can be used to implement various embodiments of the present invention. Wireless device 100 can be a mobile station, a fixed base station, or access point. Mobile stations can include devices such as mobile phones, smart phones, cellular phones, wireless enabled PDA, laptop computers, tablet computer and other mobile devices with wireless communication capabilities like those shown in FIG. 11. Base stations can include wireless routers, wireless bridges, wireless access points, cellular service towers/antennas and other fixed devices that include wireless communication capabilities like those shown in FIG. 11. A fixed wireless device is a device configured to be normally stationary when in use and wherein the mobile wireless device is a device configured to be normally usable while moving or not moving without requiring reconfiguration between moving and not moving. Alternatively, wireless device 100 can include various peripheral devices that can be used by other computing devices to communicate with other wireless devices using various methods and protocols according to embodiments of the present invention.

According to some embodiments of the present invention, the stations, mobile and fixed, can include a number of modules. The modules can be implemented in hardware, software, firmware or a combination thereof. Receiver 110 can be attached to or include an antenna 130 and be configured to receive transmissions, signals and data frames, or packets from other wireless devices. Additionally, the receiver 110 can detect, determine, observe, or otherwise sense a wide range of frequencies and send information to the processor 115. The processor 115 or the receiver 110 can detect, determine, or observe which frequency channels in TVWS or 802.11 spectra are unused in the vicinity of the wireless device 100. If there TVWS TVWS or 802.11 channels that are unused and fit within the rules or regulations for using such spectra, then the processor 115 or the receiver 110 can configure the receiver 110 to receive data signals from a fixed station or a mobile station over one or more of the available frequency channels.

Additionally, receiver 110 or processor 115 can configure transmitter 105 to transmit data over one or more of frequency channels in that the processor 115 or receiver 110 determined to be free and available for use. The transmitter module 105 can transmit on the predetermined or opportunistically determined frequency in a wide range of frequencies that can include TVWS, 802.11 and ISM spectra.

In some embodiments, various executable code including instructions for the processor to implement various methods and protocols according to embodiments of the present invention can be stored in memory 125. Memory 125 can include various types of volatile and non-volatile memory. In other embodiments, memory 125 can be a non-transitory computer readable medium such as flash memory.

Input/Output (I/O) port 120 can be used to communicate with computing or other devices using wired connections for the purpose of sharing the communication channels established using the transmitter 105 and receiver 110, for programming the processor 115 or for writing information or data to memory 125. The I/O port 120 can include any standard or proprietary connection or interface based I/O or bus standards, including but limited to universal serial bus (USB), USB 2.0, IEEE 1394 (FireWire™), serial, IEEE 1284. The I/O port 120 can also include standard or proprietary wireless connections or interfaces, such as BlueTooth™, IR, etc.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

A recitation of "a", "an" or "the" is intended to mean "one or more" unless specifically indicated to the contrary.

What is claimed is:

1. A method for operating a first wireless device as part of a wireless frequency division multiplexed communication system comprising:
    detecting a first unused frequency channel using the first wireless device;
    transmitting an uplink frame with listen-before-talk protocol on the first unused frequency channel using the first wireless device;
    receiving a downlink frame using the first wireless device, from a second wireless device on a second unused frequency channel independent of activity on the first unused frequency channel; and
    when the downlink frame indicates a collision of the uplink frame, as determined externally to the first wireless device, ending transmission of the uplink frame prior to completion of the transmission of the uplink frame.

2. The method of claim 1, wherein the first unused frequency channel comprises an 802.11 frequency channel or a television white space frequency channel or a mobile/cellular channel in licensed paired spectrum.

3. The method of claim 2, wherein the method further comprises detecting a second unused frequency channel using the first wireless device, and the second unused frequency channel comprises an 802.11 frequency channel or a television white space frequency channel or a mobile/cellular channel in licensed paired spectrum.

4. The method of claim 1, wherein receiving the downlink frame on the second unused frequency channel comprises receiving a stop frame from the second wireless device before the first wireless device completes transmitting the uplink frame.

5. The method of claim 1, wherein the first and second frequency channels are separated by at least predefined frequency multiplex gap.

6. A method for communicating between a fixed wireless device and a mobile device, wherein the fixed wireless device is a device configured to be normally stationary when in use and wherein the mobile wireless device is a device configured to be normally usable while moving or not moving without requiring reconfiguration between moving and not moving, the method comprising:
    detecting a first unused frequency channel using the fixed wireless device; and
    transmitting a downlink frame on the first unused frequency channel using the fixed wireless device, wherein when a received uplink frame indicates a collision, the downlink frame includes an instruction to the mobile device to end transmission of the uplink frame prior to completion of the transmission of the uplink frame.

7. The method of claim 6, wherein the method further comprises
    detecting a second unused frequency channel using the fixed wireless device, and wherein the first unused frequency channel comprises an 802.11 frequency channel or a television white space frequency channel or a mobile/cellular channel in licensed paired spectrum and
    wherein the second unused frequency channel comprises an 802.11 frequency channel or a television white space frequency channel or a mobile/cellular channel in licensed paired spectrum.

8. The method of claim 6, wherein transmitting the downlink frame on the first unused frequency channel comprises transmitting a stop frame from the fixed wireless device before receiving the complete uplink frame from the mobile wireless device.

9. The method of claim 6, wherein the first and second frequency channels are separated by at least a predefined frequency multiplex gap.

10. The method of claim 6, wherein the first unused frequency channel is between two other unused frequency channels.

11. The method of claim 6, the method further comprising detecting a second unused frequency channel and a third unused frequency channel using the fixed wireless device.

12. The method of claim 11 further comprising receiving an first uplink frame at the fixed wireless device from a first mobile wireless device on the second unused frequency channel and receiving a second uplink frame at the fixed wireless device on the third unused frequency channel from a second mobile wireless device.

13. A fixed wireless device comprising:
    a transmitter;
    a receiver; and
    a memory comprising computer executable code that when executed performs a method comprising:
        (a) detecting a first unused frequency channel using the receiver; and
        (b) transmitting a downlink frame on the first unused frequency channel using the transmitter, wherein when a received uplink frame indicates a collision, the downlink frame includes an instruction to a transmitting device to end transmission of the uplink frame prior to completion of the transmission of the uplink frame.

14. The fixed wireless device of claim 13, wherein the method further comprises detecting a second unused frequency channel using the receiver, and wherein the first unused frequency channel comprises an 802.11 frequency channel or a television white space frequency channel or a mobile/cellular channel in licensed paired spectrum and wherein the second unused frequency channel comprises an 802.11 frequency channel or a television white space frequency channel or a mobile/cellular channel in licensed paired spectrum.

15. The fixed wireless device of claim 14 wherein the method further comprises receiving an uplink frame at the receiver from a mobile wireless device on the second unused frequency channel while transmitting the downlink frame on the first unused frequency channel using the transmitter.

16. The fixed wireless device of claim 13 wherein transmitting the downlink frame on the first unused frequency channel comprises transmitting a stop frame from the transmitter before receiving the complete uplink frame from the mobile wireless device at the receiver.

17. A wireless local area network system comprising the fixed wireless device of claim 13 and operating on an 802.11 frequency channel or a television white space frequency channel or a mobile/cellular channel in licensed paired spectrum.

18. A method for operating a wireless network, wherein a fixed wireless device transmits over a first frequency channel to one or more mobile wireless devices that do not transmit over the first frequency channel, and wherein the mobile wireless devices transmit over a second frequency channel using a listen-before-talk protocol, wherein the fixed wireless device is a device configured to be normally stationary when in use and wherein the mobile wireless devices are devices configured to be normally usable while moving or not moving without requiring reconfiguration between moving and not moving, the method comprising:

when an active mobile wireless device of the one or more mobile wireless devices is to initiate a transmission:
(a) listening on the second frequency channel for wireless activity;
(b) if wireless activity is detected on the second frequency channel, deferring action; and
(c) if wireless activity is not detected on the second frequency channel, transmitting an uplink frame from the active mobile wireless device;

detecting, at the fixed wireless device, whether a collision is occurring with respect to a uplink frame in progress, wherein a collision is such that simultaneous transmissions from two or more of the mobile wireless devices would prevent full recovery of the transmitted uplink frame;

when a collision is detected at the fixed wireless device, transmitting a stop signal from the fixed wireless device to at least the active mobile wireless device, wherein the stop signal is sent over the first frequency channel prior to completion of the transmission of the uplink frame.

19. The method of claim 18, wherein the first frequency channel is exclusively used for the first wireless device, and wherein the first frequency channel comprises a television white space frequency channel or a mobile/cellular channel in licensed paired spectrum.

* * * * *

UNITED STATES PATENT AND TRADEMARK OFFICE
CERTIFICATE OF CORRECTION

PATENT NO. : 8,594,120 B2
APPLICATION NO. : 13/045268
DATED : November 26, 2013
INVENTOR(S) : Stefan Mangold et al.

Page 1 of 1

It is certified that error appears in the above-identified patent and that said Letters Patent is hereby corrected as shown below:

In the Claims:

Column 16, line 2
    Delete "comprises" and insert --comprises:-- therefor.

Column 16, line 7
    Delete "spectrum" and insert --spectrum;-- therefor.

Column 16, line 27
    Delete "an" and insert --a-- therefor.

Signed and Sealed this
Eighteenth Day of February, 2014

Michelle K. Lee
*Deputy Director of the United States Patent and Trademark Office*